(12) United States Patent
Dubner

(10) Patent No.: US 6,564,190 B1
(45) Date of Patent: May 13, 2003

(54) METHOD AND FORMULATING AN INVESTMENT STRATEGY FOR REAL ESTATE INVESTMENT

(75) Inventor: Peter H. Dubner, Easton, CT (US)

(73) Assignee: General Electric Capital Corporaton, Stamford, CT (US)

( * ) Notice: Subject to any disclaimer, the term of this patent is extended or adjusted under 35 U.S.C. 154(b) by 0 days.

(21) Appl. No.: 09/475,152

(22) Filed: Dec. 30, 1999

(51) Int. Cl.⁷ .............................................. G06F 17/60
(52) U.S. Cl. .......................................... 705/35; 705/36
(58) Field of Search ..................... 705/35, 36

(56) References Cited

U.S. PATENT DOCUMENTS 6,003,018 A * 12/1999 Michaud et al. .............. 705/36
6,282,520 B1 * 8/2001 Schirripa ..................... 705/36

FOREIGN PATENT DOCUMENTS

JP           410275177 A  * 10/1998 ........... G06F/17/60

OTHER PUBLICATIONS

Donald Fischer, Security Analysis and Portfolio Management, Prentice Hall, Fifth Edition, 1991, pp. 666–695.*

* cited by examiner

Primary Examiner—Douglas Hess
Assistant Examiner—Elaine Gort
(74) Attorney, Agent, or Firm—Buckley, Maschoff, Talwalkar & Allison LLC

(57) ABSTRACT

The method discloses a rule-based decision process which formulates an investment strategy in terms of short term debt, long term debt, short term equity, and/or long term equity for a variety of property types and geographic markets. The first phase of the method achieves a visual representation of the condition of each of a selected territory's major markets, showing market direction and volatility determined on the basis of commercially available market research data which has been adjusted by the investing entity in light of actual local experience in the market. The second phase deals with the implications of the first phase results on four possible alternative investment types, namely, short term debt, long term debt, short term equity, and/or long term equity. This is accomplished by formulating a set of decision rules which enable the individual investors of the investing entity to uniformly evaluate specific types of investment for each property type in a respective market area. The result is again graphically portrayed so that the investing entity can easily formulate an actionable real estate investment strategy expressed in terms of investment types (namely, short term debt, long term debt, short term equity, and/or long term equity), for each market/property pair.

11 Claims, 5 Drawing Sheets

METHOD AND FORMULATING AN INVESTMENT STRATEGY FOR REAL ESTATE INVESTMENT

BACKGROUND OF THE INVENTION

The present invention relates generally to a method for assessing real estate investments, and more particularly, to a rule-based decision process which formulates an investment strategy in terms of short term debt, long term debt, short term equity, and/or long term equity for a variety of property types and geographic markets.

There is a need for a consistent approach to assessing real estate markets that identifies areas of opportunity and, conversely, of caution. Often, market evaluations have been conducted on a deal-by-deal basis, and business decisions made this way can be the result of a tactical, rather than a strategic approach to investment analysis. Moreover, within any investment decision making process, is not uncommon for reasonable minds to differ on what factors contribute to the formulation of a successful investment strategy. For example, it is recognized that many believe that investment performance is attributed primarily to the broader market, i.e., the quality of investment decision primarily reflects the quality of the underlying market. Others may hold a different view. Such controversy during the investment strategy formulation process can be polarizing and differing opinions about the underlying investment market can lengthen the timing of the process and add complexity.

Thus, there is a need to reach consensus in advance of an investment deal transaction. Such preliminary consensus needs to be reached by having in place, a standard framework of decision rules and method of applying those decision rules that is agreed upon, in advance, by all parties proceeding through the investment decision process. The framework would be used to analyze the condition and expected trend of primary markets and property types. The steps of a process within the framework need to include the identification of regional and national trends and the systematic application of the pre-determined decision rules to the trends and associated demographic data, so that informed choices about where to focus marketing/sales effort can be made.

BRIEF SUMMARY OF THE INVENTION

The method of the present invention is a two-phase process, in which the first phase achieves a visual analytical representation of the condition of each of a selected territory's major markets, showing market direction and volatility. This view is determined on the basis of commercially available market research data which has been adjusted by the investing entity in light of actual local experience in the market. The second phase deals with what implications that performance has on four possible alternative investment types, namely, short term debt, long term debt, short term equity, and/or long term equity. The second phase enables the investing entity to formulate an investment strategy for various investment types for each property type in a respective market area. As a final step, consideration is given to how the existing investment position of the entity might further adjust the component elements of the investment strategy.

Commercially available market research data can be generated by sources internal to a given business enterprise, or accessed from commercial market research and forecasting firms. One such commercial research firm having a national reputation is Property & Portfolio Research, Inc. (PPR), a Boston, Mass. based research firm, which offers research and forecast data supportive of a quantitative approach to real estate investment and application of modern financial theory. PPR is an econometrics real estate group that predicts performance in 240 markets (60 cities and four property types) across the United States. The econometric model employed by PPR is a sophisticated analytical tool, which generates projections of changes in supply/demand/vacancy rate, resulting changes in NOI/capical value, and derived market return, which is equivalent to investor's rate of return (IRR), defined as current yield plus capital value change. Other commercial marketing research and forecasting firms are also available and would also cooperate with the present invention.

In the preferred embodiment, four property types, including multifamily, office, retail and warehouse, are identified. Each property type, being located in a specific geographic real estate market, forms a market/property pair. Each market/property pair is ranked into a nine-product risk/reward matrix on the basis of the application of a set of decision rules which address various aspects of performance: return (high/medium/low), trend (up/flat/down), and risk (high/medium/low volatility). The ranked results are graphically displayed for subsequent analysis.

In the second phase of the process, a set of decision rules which determine whether, and to what extent, to pursue short term debt, long term debt, short term equity, and/or long term equity for a given market/property pair are formulated and each market/property pair graphically portrayed in the first phase is ranked into a simplified four-product matrix on the basis of the application of the set of decision rules. This is accomplished by a systematic application of a set of rules to the contents of each "box" of the nine-product matrix. The result is again graphically portrayed so that the investing entity can easily formulate an actionable real estate investment strategy expressed in terms of investment types (namely, short term debt, long term debt, short term equity, and/or long term equity), for each market/property pair.

DETAILED DESCRIPTION OF THE INVENTION

Figure 1:
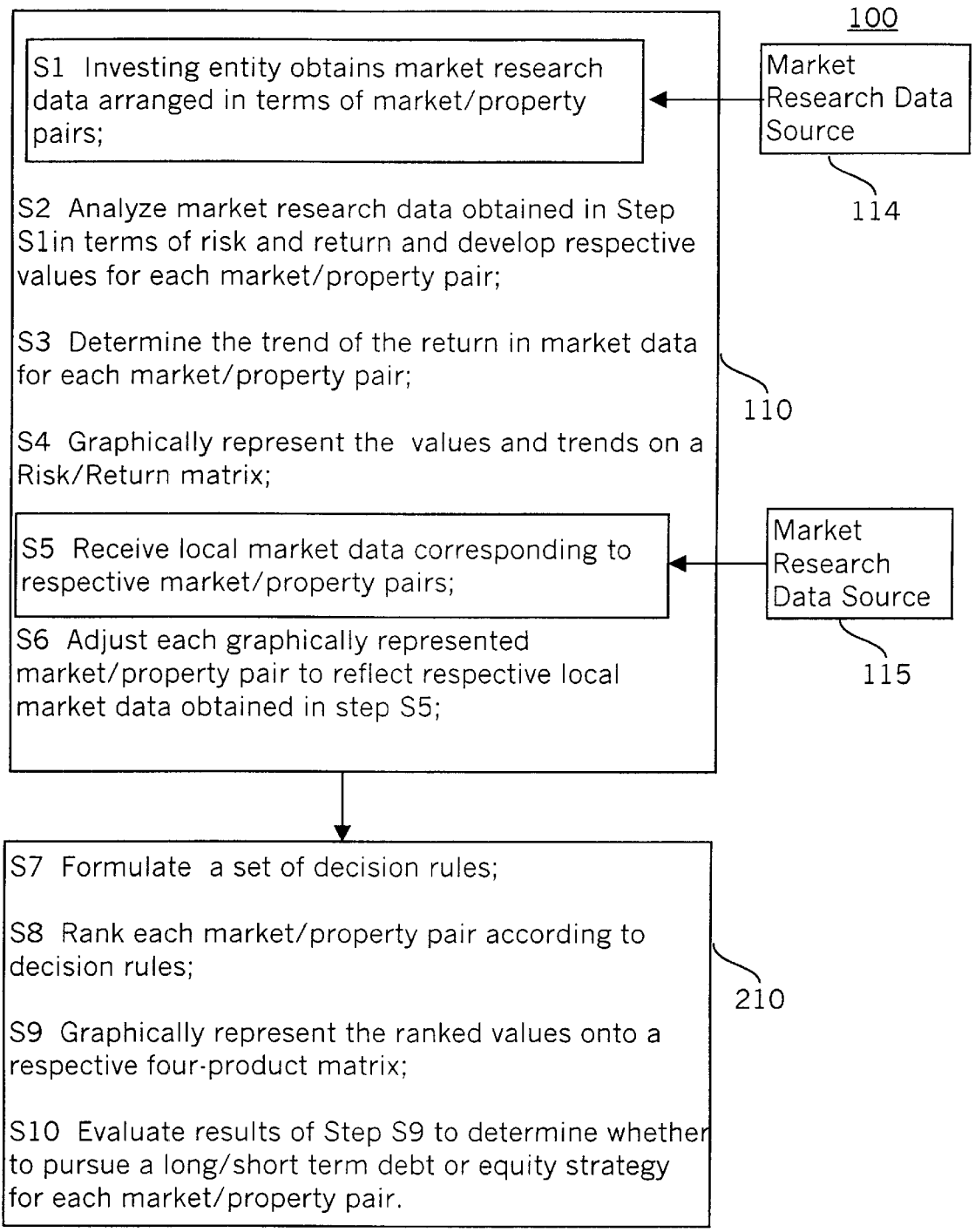
FIG. 1 shows the two-phase process of the present invention.

FIG. 1 shows the method 100 of the present invention as including a two-phase process having a first phase 110 and a second phase 210. The first phase 110 achieves a visual representation of the condition of each of a selected territory's major property/market pairs, showing market direction and volatility. It is a view of the real estate market performance in terms of real estate ownership. This view is determined on the basis of commercially available market research data which has been adjusted by the investing entity in light of actual local experience in the market. The second phase 210 deals with what implications that performance has on four possible alternative investment types, namely, short term debt, long term debt, short term equity, and/or long term equity, and enables the investing entity to make a selection of a specific investment type for each property type in a respective market area.

In Step S1 of the first phase 110, the investing entity obtains market demographics, risk/reward and projected trend data from a commercially available real estate market research and forecasting source 114. In the calculation of the preferred embodiment, 240 market/property pairs are considered to comprise a statistically significant, large population. Such data is represented in a known econometric model, which enables projections of changes in supply/demand and vacancy rate, resulting changes in NOI/capital value, and derived market return, which is equivalent to IRR, defined as current yield plus capital value change. This model is driven by relationships among demographic metrics, available from a variety of sources over a fifteen year history, which has been correlated with historical real estate performance.

The commercially available demographic metrics include population/employment growth, employment by SIC code, unemployment, inflation, and sales. The history data and forecasts based on an econometric model include supply (contract awards, stock, depreciation), demand (population growth, employment growth/SIC concentration), vacancy rate (historical data, future projection based on supply/demand changes), and NOI/capital value changes (proxy based). Subjective variables for "intensity of use of office space", forecast construction, and depreciation are also used.

Figure 2:
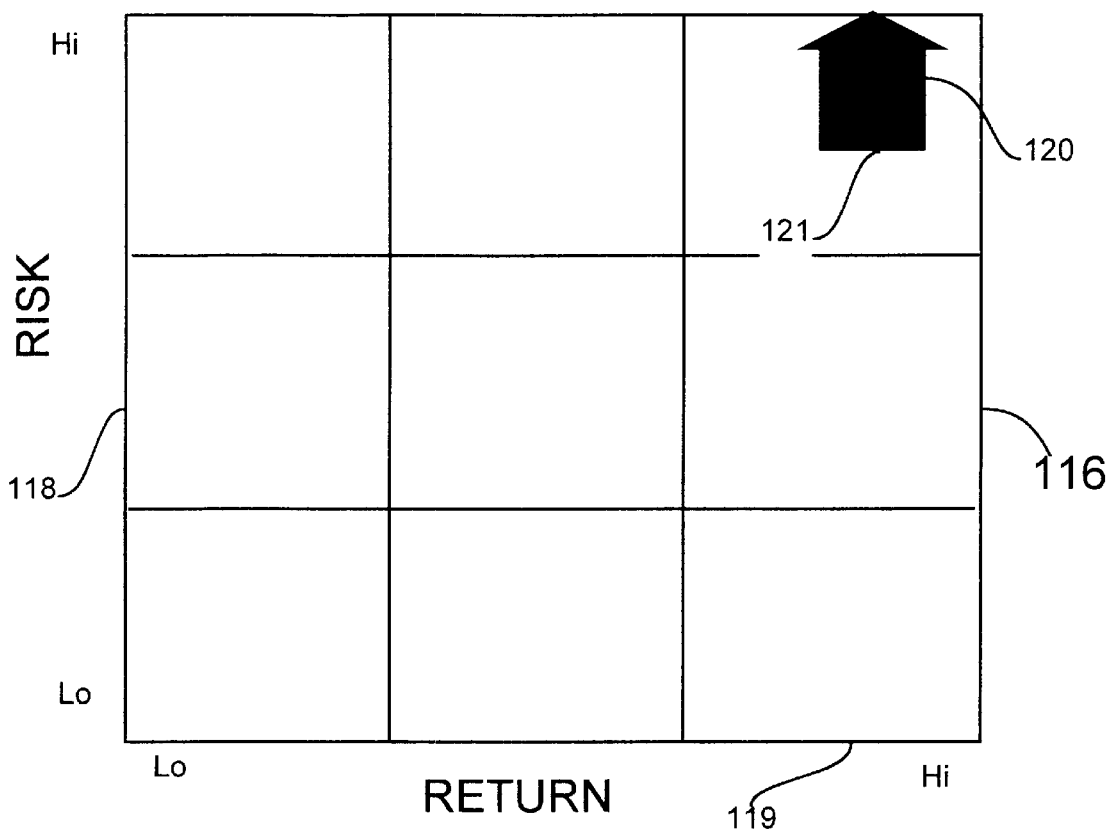
FIG. 2 shows an example 3×3 risk/reward matrix, according to the present invention.
Figure 2:
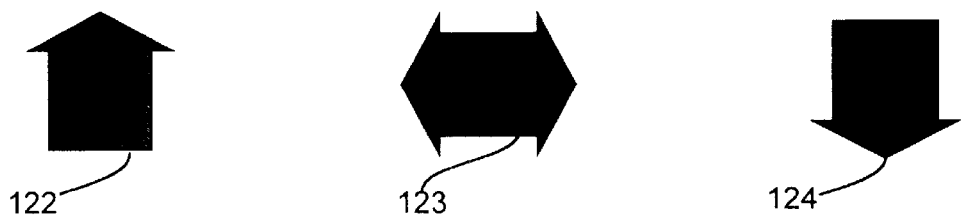

FIG. 2 shows an example 3×3 risk/reward matrix 116, which includes "Risk" on the vertical axis 118 and "Return" on the horizontal axis 119 of the matrix. Optionally, other size matrices and investment parameters can be used. "Risk" is defined as historical volatility of the unlevered returns, as measured by standard deviation and adjusted during the review process 110. "Return" is defined as the expected five year unlevered return, i.e., the expected IRR from buying without any financing. Values begin at the lower left corner as "low" and range to "high" in directions leading up, and also to the right. Thus, a high risk, high return value would be graphically represented by a symbol 120 located in a determined position 121 in the upper right block of the 3×3 matrix 116. Advantageously, the symbol 120 is an arrow pointing in the direction of the market trend, as determined by market research data provided by market resource 114. This scheme therefore includes three possible arrows, including upward 122, double-headed sideways pointing arrows 123, and downward 124.

Referring again to FIG. 1, in step S2, the investing entity analyzes the risk, the return, and trend of the return data for property types within a major strategic market area. For example, in the preferred embodiment, the major strategic area is a metropolitan statistical area, four property types are identified as multifamily, office, retail and warehouse and the graphic symbol is an arrow. Other definitions for major strategic area and property type are also possible. As will be described later in connection with steps S5 and S6, the assumptions made by the commercial market research data source are examined in terms of local market data inputs, and the analysis is adjusted, as necessary.

The measure of risk used in the present invention is the standard deviation of return and preferably is calculated over a 5-year projected period. For each measured property of the 240 market/property pairs, a corresponding 3×3 matrix 116 is arranged such that the X-axis (Risk) 119 of the matrix is scaled in levels of standard deviation, and the Y-axis (Reward) 118 is scaled as derived market return or IRR. The scale for the X-axis is defined such that two standard deviation values are identified such that ⅓ of the standard deviation values for the 240 market/property pairs fall below the lower standard deviation value, ⅓ fall between the lower and higher values, and ⅓ fall above the higher standard deviation value. For example, the Risk scale can be defined such that ⅓ of the standard deviation values fall below the 5% standard deviation, ⅓ fall between 5% and 10% standard deviation, and ⅓ fall above 10% standard deviation. Thus, for a given measured parameter, using an arrow symbol, each point is plotted in the 3×3 matrix in terms of the where the standard deviation falls along the X-axis (high/medium/low volatility).

Likewise, the scale for the Y-axis is defined such that two investor's rate of return (IRR) values are identified such that ⅓ of the IRR values for the 240 market/property pairs fall below the lower IRR value, ⅓ fall between the lower and higher values, and ⅓ fall above the higher IRR value.

In step S3, the direction of the arrow symbol 120 is determined by examining the trend in return over the period of time, and in step S4, that trend is symbolized by arrow 122, 123 or 124 (up/flat/down) on a position 121 of matrix 116. The return is the average 5-yr IRR, but more practically, the annual values that comprise the 5-yr average are examined to determine if the values for Return are increasing year by year over that period of time, remaining the same, or downward trending. For example, for arbitrary values 10 5,6,7,8,9, the average is 7, and therefore a point is plotted at 7 and shown as an up-arrow. If the values are 7,7,7,7,7, a flat arrow is plotted, and for values of 9,8,7,6,5, a down-arrow is plotted.

In step S5, which, as a practical matter, is more reasonably performed earlier, the investing entity obtains local market data 115 corresponding to respective market/property pairs. This includes knowledge of local facts of which a nationwide market research firm may not be aware, such as, for example, specific developer plans, actual housing starts, changing commercial demographics such as an expected closing (or arrival) of a large employer.

In step S6, once all market/property pairs have been plotted, the investing entity evaluates a number of the key factors that have lead the commercial market research entity to the obtained results, and which have been plotted. The investment entity compares those key factors with the local experience, knowledge and estimates obtained in step S5, and then subjectively adjusts the plotted location or trend symbol of the plotted market/property pair. For example, the market researcher may have arrived at a very high reward for a given market/property pair, for example, apartments in Orlando, Fla., because the researcher assumed in its econometric model that there will be very few new apartment starts, and therefore an ongoing low supply of new apartments with correspondingly high prices. However local knowledge of the Orlando apartment market may include information about specific, new development contracts and local investor interest that will lead to completion of housing units over the projected 5-year term. With this local input in hand, the investing entity subjectively adjusts a plot point according to local experience. For an apartment market/property pair, the plot of which is in the upper right corner, which signifies high Risk, high Reward, may be adjusted to a Medium Risk, High Reward, or alternatively, if knowledge about trend indicates a change in direction of magnitude, the direction of an arrow symbol may be changed.

Figure 3:
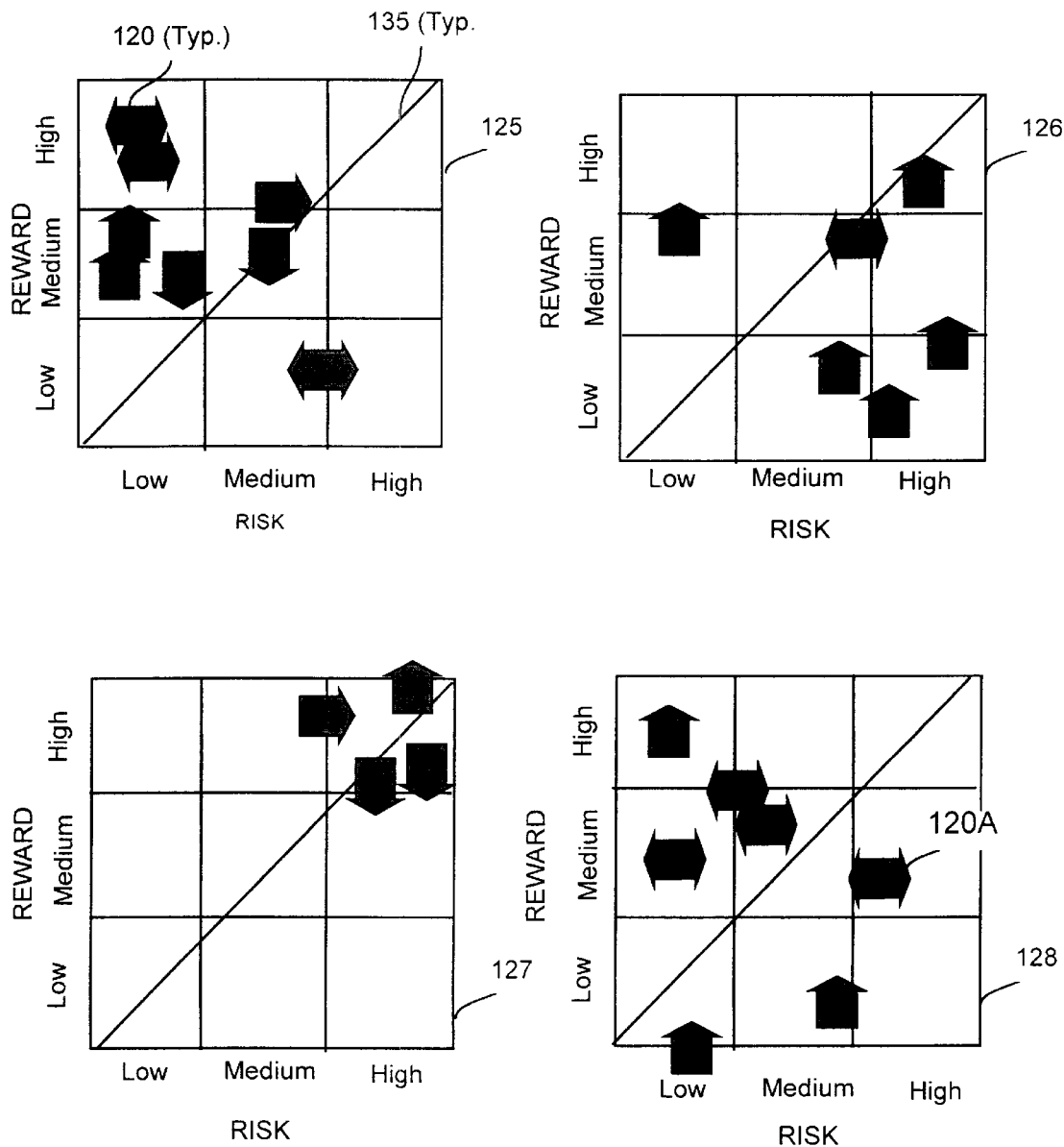
FIG. 3 shows the 3×3 risk/reward matrix of FIG. 2, applied to four property types located in a number of different metropolitan statistical areas, according to the present invention.

FIG. 3 shows, as a non-limiting example, the 3×3 risk/reward matrix 116 applied to four property types located in a metropolitan statistical area. Each property type is represented by an individual matrix, including "Apartments" matrix 125, "Retail" 126, "Office" 127 and "Warehouse" 128. Multiple instances of arrow symbols 120 (typical) are shown, each representing respective market/property pairs. Arrow symbols 120 are shown as each representing a separate market/property pair. For instance, the warehouse property type located in Orlando, Fla. is represented by arrow symbol 120A in matrix 128. The specific sideways-pointing aspect of arrow 120A indicates that the investment return trend for the warehouse market in Orlando is neither up, nor down.

The diagonal threshold line 135 in each matrix 125–128 represents an exemplary arbitrary dividing line between favorable and unfavorable reward. Any such boundary may be selected by the investor, however it is important (from a consensus viewpoint) that this be determined in advance of ongoing evaluations of market/property pairs. Arrow symbol 120 for a particular property type located on line 135 represents the instance in which risk equals reward, which generally is thought to be a suitable investment. A symbol 120 falling to the left of line 135 represents a favorable reward/risk ratio, i.e., the reward is better than the corresponding risk. A symbol 120 falling to the right of line 135 represents an unfavorable reward/risk ratio, i.e., the reward is less than the corresponding risk. Typically, the investor would choose to regard all blocks falling below threshold line 135, however defined, as unattractive.

In FIG. 3, the lower, right corner is understood to be low reward, high risk, and therefore an investment decision in connection with a market/property pair in the lower-right block would be one of caution, also termed "selective". The same logic applies to the lower-middle and right-middle blocks, which also would be "selective". It can be seen that these blocks are all below diagonal line 135. The center box, being on line 135, is valued by interpolation. The middle-high block (top row, middle column) and left-middle block (left column, middle row), being above the diagonal line 135 represent more positive investment choices. For example, with reference to the above discussion of the Orlando, Fla. warehouse market/property pair symbolized by arrow 120A, the right column-middle block location of the arrow in matrix 128 is indicative of a medium reward with high risk, and also happens to fall below the exemplary arbitrary threshold diagonal line 135.

Steps S2–S6 are repeated until the first phase 110 of method 100 has been applied to each major strategic area under consideration. In the preferred embodiment, the resulting four matrices, shown in example form in FIG. 3, graphically indicate the outlook for unlevered equity returns by metropolitan statistical area and property type over the next 3–5 years, together with volatility and trend. It is apparent that the risk/reward matrix, as exemplified by matrices 124, 126, 128 and 130, is a compact visual representation of the condition of each of the territory's major markets, where they are headed, and how volatile they tend to be. Although seemingly simple in appearance, significant amounts of complex and varied data are incorporated in, and represented by, the easily understood and comprehensive form shown in FIGS. 2 and 3. The simplicity of form lends to the decision process necessary for management of a complex real estate portfolio.

It will be recalled that the objective of first phase 110 is to indicate how the real estate properties will perform in the corresponding market, as expressed graphically in terms of a risk/reward and trend profile for each property/market pairs, as exemplary illustrated in FIGS. 2 and 3. In the second phase 210, the investment entity wants to determine what its appetite will be for making one of four investment options, or investment types, for each of those performing market/property pairs. The investment entity wants to determine how, and if, it should invest in one of four investment types, namely, short term debt, long term debt, short term equity, and/or long term equity for each of the performing market/property pairs illustrated in the first phase 110.

In step S7 (second phase 210), the investing entity formulates a set of decision rules that enables the investor to determine what investment type to pursue (i.e., short term debt, long term debt, short term equity, and/or long term equity) and to what degree a given investment type is pursued for each of the four property types (i.e., in the preferred embodiment, apartment, retail, office or warehouse). The process of generating decision rules is one of deciding on rules which embody the investment policies and investment theory of the investing entity. In step S7, the investing entity determines what specific investment strategy should be followed in light of the portrayal of the market/property pairs developed in first phase 110. To accomplish this, a pre-determined set of decision rules must be established, which are acceptable to all investor-members of the investing entity. The decision rules determine for a given property type residing in a given market, how different investment types (namely, short term debt, long term debt, short term equity, and/or long term equity), which have that underlying property market as collateral to that investment, will be selected.

For example, a market/property pair such as Orlando, Fla. apartments, that has a very high return, high risk, would not be an equally suitable investment in terms of each of the four investment types. A market with high return and high risk, would be a good equity investment, however, the debt investment would likely be less preferable because the high volatility is a stronger consideration in making a debt investment. In that case, the lender would get the downside risk/reward, but none of the upside risk/reward. Similarly, if a property/market pair has a high risk/reward, but a downward trend, it may be preferable for a short term equity bet, but not for the long term, because it is trending down.

To accomplish this rule-generation process, a framework is established for visually representing the ownership-oriented information graphically portrayed in the first phase 110 in a form meaningful to the potential investor. This framework will be described and then an exemplary set of decision rules be will discussed in connection with the framework.

With reference to FIGS. 2 and 3, which show the 3×3 matrix 116 as including three possible direction-arrows, 122, 123, 124, it can be seen that there are twenty seven possible decision rules associated with a given market/property pair portrayed in matrix 116. (Nine blocks times three types of arrows.) These twenty seven possibilities translate to four possible investment types for that given property/market pair. This is further compounded by application of these twenty seven times four occurrences over a number of property types, resulting in a substantially complex set of data. The simplified approach of the present invention deals with such complexity by systematically applying decision rules to the data set and graphically portraying the results for ease of analysis.

Rather than considering all nine boxes of the 3×3 matrix, the method of the present invention focuses on the four corners of the 3×3 matrix. The remaining five boxes can be informally interpolated, as necessary. This reduces the possibilities to four boxes times three possible types of arrows, or twelve decision rules, as they relate to the four investment types, namely, short term debt, long term debt, short term equity, and/or long term equity. The interpolative process for arriving at values for the remaining boxes can be a process of "informed guessing" by the experienced user.

Figure 4:
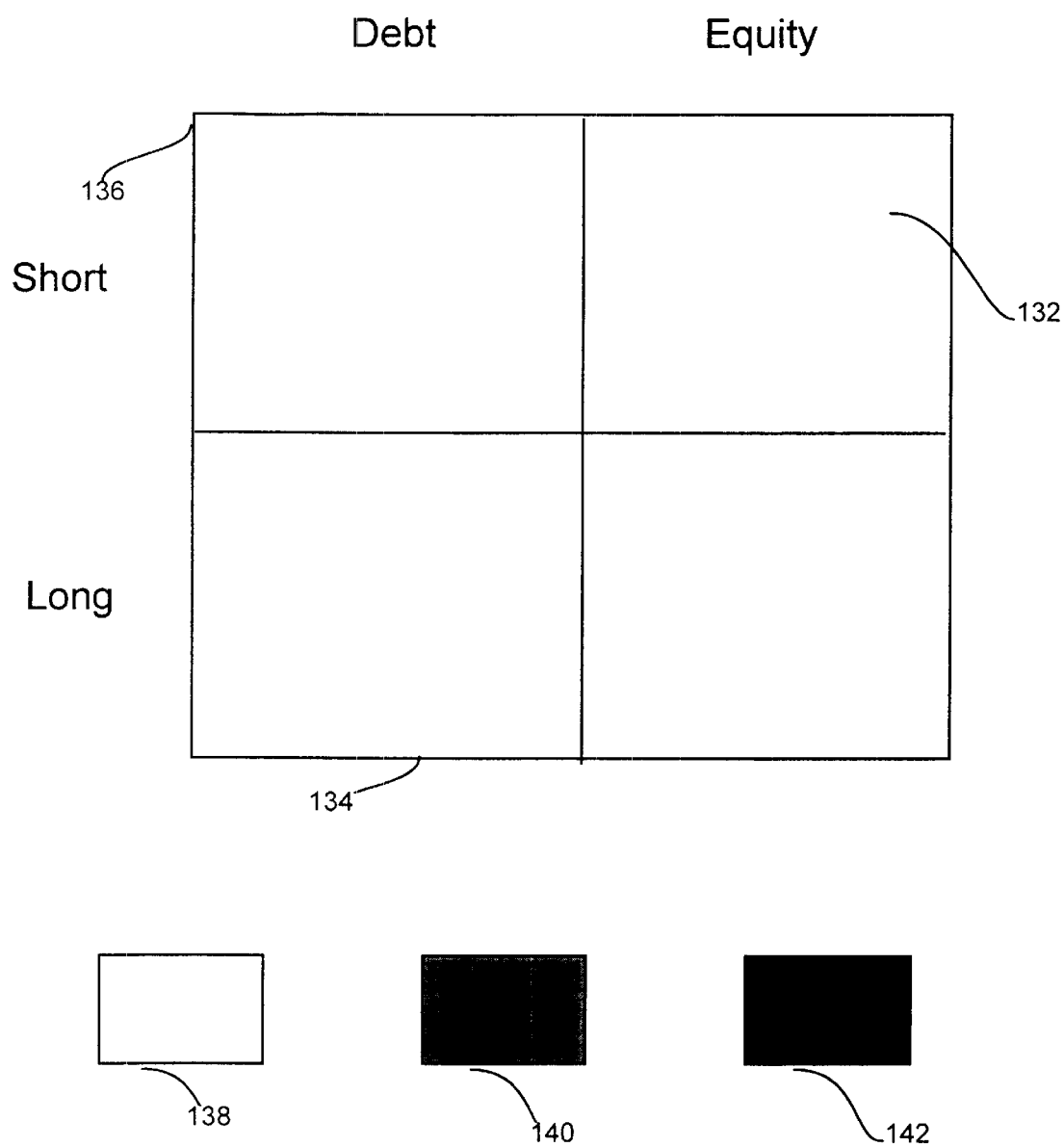
FIG. 4 shows the framework of the second phase in the form of a simplified, four-product debt/equity-short/long term matrix, according to the present invention.

FIG. 4 illustrates the framework of the second phase 210 in the form of a simplified, four-product matrix 132, which is useful for illustrating the results of the application of the twelve possible decision rules. This 2×2 matrix consists of "Debt" and "Equity" variables arranged along the horizontal axis 134 and "Short" and "Long" variables arranged along the vertical axis 136 of the matrix. The "Short" variable is arbitrarily set at 3 years, although any period appropriate to the investment principles employed by the investing entity will do. Within the four squares of the matrix, any suitable symbol representing degrees of investment interest is written or affixed, for example, three degrees are selected as weak focus, medium focus and strong focus. Any graphic symbolism can be utilized, for example, in the preferred embodiment, gradations of shading from light to heavy are employed, wherein light shading represents weak investment focus, in which investment would be made on a "selective" basis, shown in square 138, medium shading represents medium investment focus, in which investment would be made on a "pursue" basis, shown in square 140, and heavy shading represents investment made on a "strong" basis, shown in square 142.

Referring again to the three types of arrows, "up" 122, "sideways" 123, and "down" 124 of the first phase of the present invention, a new graphic representation is formed, which combines the information represented by the direction of an arrow 120 with the information represented by the position 121 of arrow 120 within a particular square of the 3×3 risk/reward matrix 116.

Figure 5:
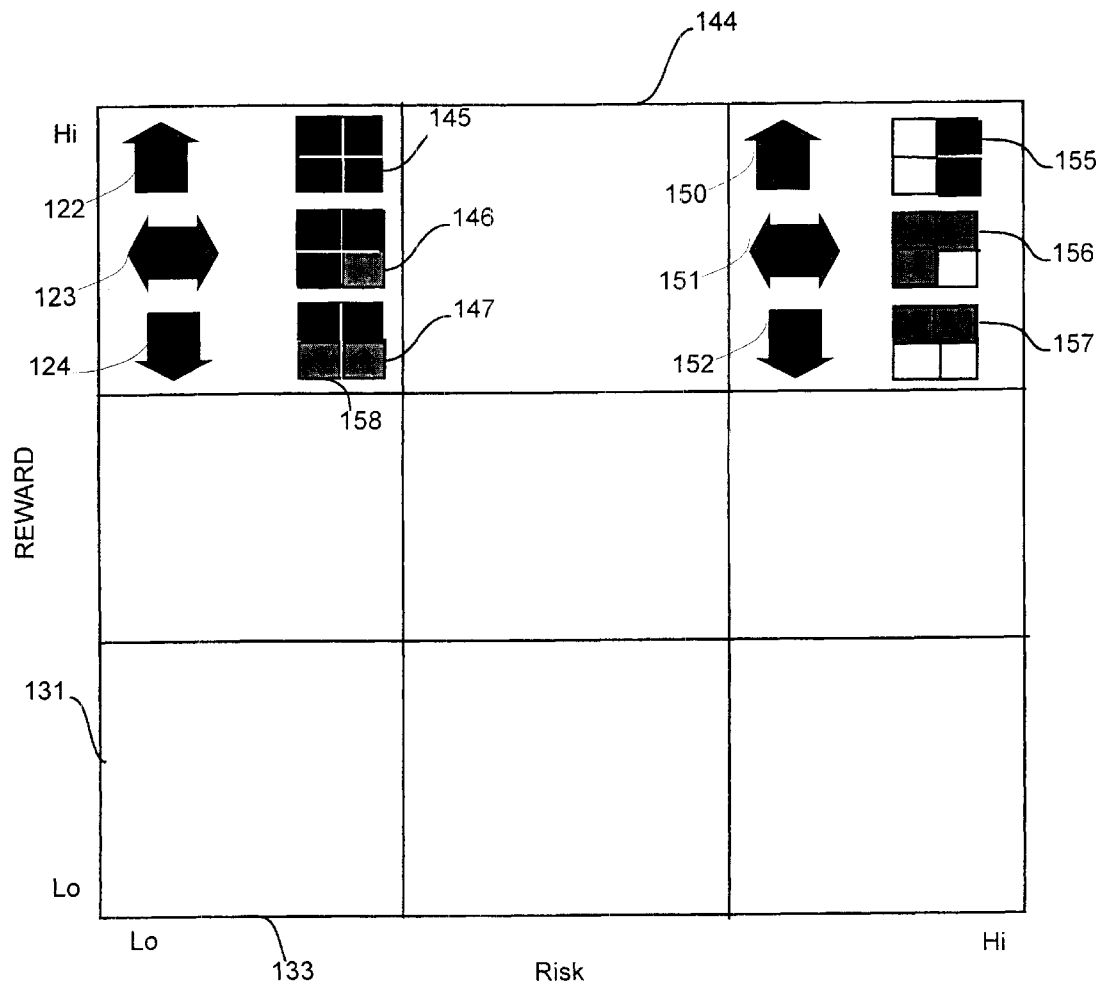
FIG. 5 shows a nine-product risk/reward decision rule matrix, according to the present invention.

FIG. 5 shows a nine-product risk/reward decision rule matrix 144 which includes "Risk" on the vertical axis 131 and "Return" on the horizontal axis 133 of the matrix. Matrix 144 includes the three possible arrows 122–124 arranged in the upper and lower, left and right, corners of the matrix. For any given application, arrows corresponding to the remaining five boxes are also present, but for clarity of description, they are omitted here.

The upper left corner of matrix 144 represents the high return/low risk market, and the direction of the arrow represents the direction of the trend in that particular market. In the preferred embodiment, the decision rules are defined such that an upward pointing arrow 122 is represented by a 2×2 matrix 145 in which all four squares are heavy-shaded. The sideways pointing arrow 123 is represented by a 2×2 matrix 146 in which all squares are heavy-shaded except for the lower right square, which is medium-shaded. The downward pointing arrow 124 is represented by a 2×2 147 matrix in which the left and right top squares are heavy-shaded, the lwer righet square is medium-shaded, and the lower right square is light-shaded.

Thus, for the downward arrow, the decision rule graphically portrayed by the 2×2 matrix 147 indicates that for the Equity investment type, a "strong" focus is indicated for the Short Term, and for the Debt investment type, a "strong" focus is indicated for the short term and a "Pursue" focus is indicated for the long term.

Turning to the upper right corner of the 3×3 risk/reward matrix 144, in the preferred embodiment, the decision rules are defined such that the upward pointing arrow 150 is represented by a 2×2 matrix 155 in which left top and bottom squares are light-shaded and the right top and bottom squares are heavy-shaded. The sideways pointing arrow 151 is represented by a 2×2 matrix 156 in which all squares are medium-shaded except for the light-shaded square at the lower right. The downward pointing arrow 152 is represented by a 2×2 matrix 157 in which the top right and left squares are medium-shaded and the bottom right and left squares are light-shaded.

Turning to the lower left and right corners of matrix 144, in the preferred embodiment, a decision rule is established in which the bottom ⅓ of the Reward scale is determined to be below a certain minimum threshold of acceptability for investment purposes. As a result the rule for the bottom lower right and left corners of matrix 144 requires that all possible arrows be represented by light-shaded boxes (indicative of least preferable investment value), and therefore corresponding 2×2 matrices are omitted from FIG. 5.

In step S8, the graphic portrayal of the process will operate generally with any set of decision rules. The investing entity ranks each market/property pair into the four-product matrix 144 on the basis of the application of the particular set of decision rules acceptable to that entity, which determine whether to pursue a short term/long term debt or equity strategy for that market/property pair. In particular, lower volatility markets favor debt investments. Higher return markets favor equity investment. Market trend drives term and debt appetite. Possibly, depending on the particular set of rules employed, below certain minimum threshold returns, no investment type is favored. For example, with reference to the four-product matrix 158, located in the upper left corner of matrix 144, in total, the graphic symbol 158 is located in a high return/low risk market that has a downward trend. The appearance of graphic symbol 158 represents underlying data indicating for equity, a "strong focus" over the short term, and for debt, a "strong focus" over the short turn, and "pursue" over the long term.

In step S9, the investor again makes an adjustment to the derived results. It will be recalled that the adjustment step S5, in which the market/property pair analysis, which was based on commercial research of national marketing data, was further adjusted in the face of known local market information. In a similar fashion, knowledge of the investor's existing market exposure is applied to the results derived in step S8. Using this knowledge, and while not necessarily changing the graphic portrayal set forth in step S8, the investment conclusions indicated by the symbology resulting from decision rule application, as shown in FIG. 5, are either upgraded, downgraded, or utilized as is. Alternatively, simple graphic icons are selected and applied, each indicating one of the three alternative adjustments reflecting the investor's existing market exposure.

In step S10, the investor, evaluates the graphic portrayal of the results obtained in step S9 to determine whether to pursue a short term debt, long term debt, short term equity, and/or long term equity investment type for each property type in a respective market area.

What is claimed is:

1. A method for formulating a real estate investment strategy, comprising the steps of:

receiving market data for at least one market/property pair from at least one data source, wherein said market/property pair represents a respective combination of a strategic market area and a property type;

analyzing said received market data so as to develop at least one respective value for each said market/property pair;

determining at least one trend indicator corresponding to each said at least one respective value;

representing said at least one respective value graphically as respective first graphic representations, said respective first graphic representations including graphic symbols selected, ordered, oriented, and positioned on a nine-product risk/reward matrix according to said at least one respective values and said at least one trend indicators;

receiving local market data corresponding to said at least one market/property pair;

adjusting said respective at least one first graphic representations in terms of the received local market data to yield respective locally adjusted first graphic representations;

formulating a set of decision rules, said decision rules being operable for analyzing said respective locally adjusted first graphic representations in terms of short term debt, long term debt, short term equity, and long term equity;

analyzing said respective locally adjusted first graphic representations in terms of said decision rules to yield respective investment rank values; and representing said respective investment rank values as corresponding respective second graphic representations including graphic symbols selected, ordered, oriented, and positioned on a four-product short term-long term/debt-equity matrix according to said respective investment rank values, wherein said respective second graphic representations form the basis for selecting a real estate investment strategy.

2. The method as set forth in claim 1, further comprising the step of adjusting said respective investment rank values in terms of existing market exposure.

3. The method as set forth in claim 1, wherein the step of selecting a real estate strategy comprises for each said market/property pair the step of determining whether to pursue an investment type selected from the group of short term debt, long term debt, short term equity, and long term equity investment types.

4. The method as set forth in claim 1, wherein said property type comprises at least one of a group comprising office, industrial, retail, and domestic property types.

5. The method as set forth in claim 1, wherein said at least one data source is a commercial market research company.

6. The method as set forth in claim 5, wherein said market data is represented in a known econometric model driven by demographic metrics which enables projections of changes in at least supply/demand and vacancy rate, resulting changes in NOI/capital value, and derived market return driven by demographic metrics.

7. The method as set forth in claim 1, wherein the step of analyzing further comprises analyzing at least one risk value, return value, and trend of the return value.

8. The method as set forth in claim 7, wherein the at least one risk value is defined as historical volatility of the unlevered returns, as measured by standard deviation, and the at least one return value is defined as expected five year unlevered return.

9. The method as set forth in claim 1, wherein said graphic symbols comprise an up-arrow, a down-arrow, and a double-headed, sideways-arrow corresponding respectively to an up-trend, a down-trend and an unchanging trend.

10. The method as set forth in claim 9, wherein said respective investment rank values each represent a degree of investment interest and said corresponding respective second graphic representations each comprise a gradation of shading selected from a series of shading including a first shading level indicating weak investment focus, a second shading level indicating medium investment focus, and a third shading level indicating strong investment focus.

11. The method as set forth in claim 10, wherein in an upper right corner of said nine-product risk/reward matrix said up-arrow is represented by a first 2×2 matrix of squares in which left top and bottom matrix squares have said first shading level and the right top and bottom squares have said third shading level, the sideways-arrow is represented by a second 2×2 matrix of squares in which all left and right top matrix squares and a left bottom matrix square have said second shading level and a right bottom matrix square has said first shading level, the downward pointing arrow is represented by a third 2×2 matrix of squares in which top right and left matrix squares have said second shading level and bottom right and left matrix squares have said first shading level, wherein in an upper left corner of said nine-product risk/reward matrix said up-arrow is represented by a fourth 2×2 matrix of squares in which all matrix squares have said third shading level, the sideways-arrow is represented by a fifth 2×2 matrix of square in which top left and right squares and a left bottom square have said third shading level, and a right bottom square has said second shading level, the down-arrow is represented by a sixth 2×2 matrix of squares in which left and right top squares have said third shading level and said left bottom square has said second shading level and a right bottom square has said first shading level, and wherein in a lower left corner and a lower right corner of said nine-product risk/reward matrix said up-arrow, said sideways-arrow and said down-arrow are represented by a seventh 2×2 matrix of squares in which all squares have said third shading level.

* * * * *